United States Patent [19]

Kubota

[11] Patent Number: 5,001,736

[45] Date of Patent: Mar. 19, 1991

[54] MEDICAL IMAGING APPARATUS

[75] Inventor: Mitsuharu Kubota, Fujisawa, Japan

[73] Assignee: Osamu Kajino, Japan

[21] Appl. No.: 400,863

[22] Filed: Aug. 30, 1989

[51] Int. Cl.$^5$ .............................................. H05G 1/64
[52] U.S. Cl. ..................................... 378/99; 358/111
[58] Field of Search ................... 378/99, 190; 358/111

[56] References Cited

U.S. PATENT DOCUMENTS

| | | | |
|---|---|---|---|
| 4,380,818 | 4/1983 | Rfeiler | 378/99 |
| 4,493,096 | 1/1985 | Rieke | 378/99 |
| 4,503,459 | 3/1985 | Haendle et al. | 378/99 |
| 4,658,413 | 4/1987 | Nishioka et al. | 378/99 |
| 4,852,139 | 7/1989 | Sandrik et al. | 358/110 |

*Primary Examiner*—Carolyn E. Fields
*Assistant Examiner*—David P. Porte
*Attorney, Agent, or Firm*—Wall and Roehrig

[57] ABSTRACT

An x-ray source having two levels of radiation is used to radiate a target and the x-ray image is displayed on an image intensifier. A video camera photographs the x-ray image and displays it on a monitor screen directly when the source is in a first low level mode of operation. When a selected image is identified, a control generator is activated which changes the mode of operation of the x-ray source to a higher level while at the same time inactivating the video camera for a period of time sufficient to allow the monitor screen to be cleared. The camera is then activated and at least one video frame of the high intensity x-ray image is stored in memory. The control generator also serves to synchronize the various activities of the components.

6 Claims, 2 Drawing Sheets

… … …

MEDICAL IMAGING APPARATUS

BACKGROUND OF THE INVENTION

The present invention relates generally to medical x-ray imaging equipment and in particular to medical x-ray imaging equipment for displaying roentgenoscopic images of a desired target upon a monitor, selecting given images from the displayed images, storing said selected images in memory, and recalling and displaying the selected images on the monitor.

For diagnostic practices, medical x-ray imaging equipment is often times employed for obtaining and recording roentgenoscopic images of a diseased area of a patient. The images are taken from certain predetermined angles which are necessary for recognizing and evaluating therapeutical efficacy and determining if further treatment is necessary.

In order to conduct the above-noted tasks using conventional techniques, the roentgenoscopic image of the diseased part is typically registered onto a photographic film in the form of an x-ray image and the film is later developed. In an alternative method, signals from a video camera are projected onto a film while observing the transmitted images upon a TV monitor.

While a transmitted x-ray photograph can be produced directly from the target using the above-noted film method, the amount of x-ray dosage necessary for registering the x-ray image upon the film generally is relatively large. Accordingly, the amount of potential leakage of radiation is correspondingly large resulting in a risk to both the patient and the technicians who operate the x-ray equipment. It is further noted that photographs produced by this method are usually unclear and do not possess the contrast necessary for complete or accurate diagnosis.

Directly photographing x-ray images produced on a TV monitor have been proposed, however, the scanning periods required by most TV systems are not compatible with those of most x-ray systems thus making the photographic process difficult.

OBJECTS AND SUMMARY OF THE INVENTION

In order to overcome technical problems involved in most conventional methods of recording x-ray images on TV monitors, it is an object of the present invention to provide apparatus by which an x-ray radiated image of a target can be recorded in synchronization with the scanning signal of a TV camera to provide instantaneous viewing and recording of a target area.

According to one of the preferred embodiments of the present invention, the x-ray imaging device is constructed of (1) an x-ray unit for selectively radiating a target to be examined with one of two available levels of radiation, (2) a video camera for photographing the x-ray radiated images obtained from the target, (3) an a/d converter for converting the output from the video camera into digital signal information, (4) a digital memory device for producing a 1-frame memorization of said converted digital signals, (5) a d/a converter for reading out memorized signal information and for converting this information into an analogue signal for display, (6) a monitor by which the output from the d/a converter is presented as a visual signal and which is synchronized with the readout from said memory, and (7) a timing generator for synchronizing and controlling the various components of the system.

In operation, low energy x-ray images are continuously displayed on a monitor. When it is desired to record a particular image; the following operational sequence is carried out using the above-noted equipment. To memorize a given image, the electron beam of the TV camera is initially turned off thereby allowing the photogene image on the monitor screen to vanish completely. Once the photogene image has vanished, the target is radiated with x-rays at a second higher level and the TV camera is once again switched on in synchronization with the vertical and horizontal scanning signals of the video system. The video image is then sent to the memory where it is stored for viewing at a later time.

BRIEF DESCRIPTION OF THE DRAWINGS

For a better understanding of these and other objects of the present invention, reference will be made to the following detailed description of the invention which should be read in conjunction with the accompanying drawings, wherein.

DETAILED DESCRIPTION OF THE INVENTION

Figure 1:
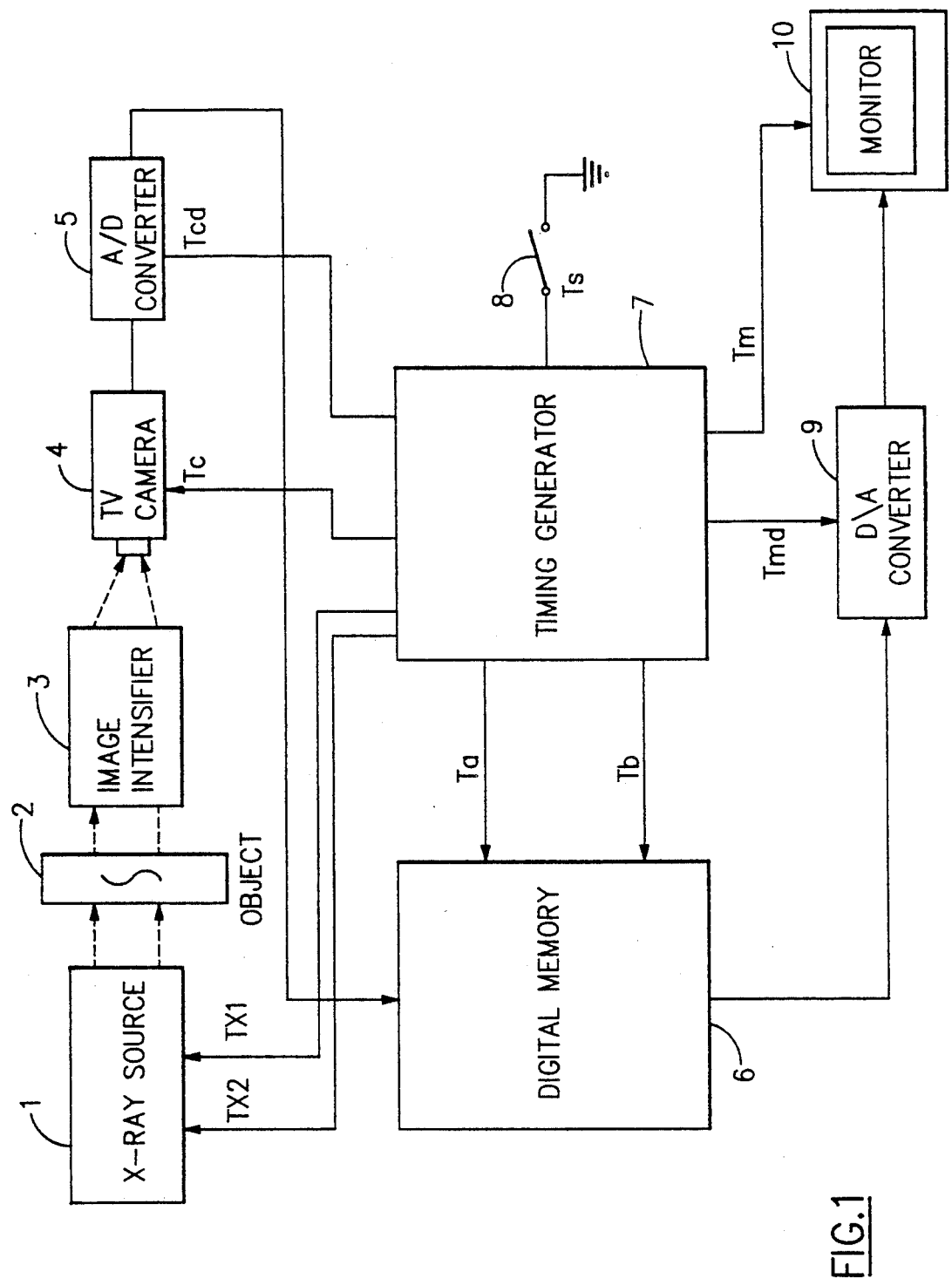
FIG. 1 is a block diagram showing a preferred embodiment of the present invention.

FIG. 1 is a block diagram of the x-ray imaging equipment of the present invention. The electrical components of each circuit is constructed so that it may be independently reset. As shown in FIG. 1, an x-ray source 1 is used to focus x-ray radiation upon a target 2 in such a way that the x-ray images are presented upon an image intensifier 3. The x-ray source is capable of selectively transmitting on demand a first lower energy level of radiation or a second higher energy level of radiation. In operation, a TV camera 4 begins to operate automatically when the x-ray source 1 begins to irradiate the target. This, in turn, causes the roentgenoscopic images formed on the image intensifier to be projected onto the TV camera 4. The output signals from the video camera, which correspond to the transmitted x-ray images formed on the image intensifier 3, are next converted from analogue signals to digital signals by means of an a/d converter 5. The output signals from the a/d converter are applied to a digital memory 6. In the digital memory 6, image signals for each video frame are divided into image elements and each corresponding image element is stored into a relevant memory site. A one M DRAM (Dynamic Random Access Memory) may be used for this purpose. A timing generator 7 sends a start signal $Tx_1$ to the x-ray source to initiate the imaging, display and storing sequence. In addition, the timing generator 7 has added circuitry for carrying out additional functions. The generator has the capability of controlling the x-ray source to produce soft (weak) x-rays which are displayed as images on a monitor 10, as will be explained in greater detail below. The generator also controls the synchronization of vertical and horizontal scanning signals Tc of the video camera and converting the synchronized signals Tcd to the a/d converter 5. The memory synchronized signals Ta and data address signals of the digital memory Tb also originate in the timing generator.

The timing generator 7 also synchronizes the signals which are readout from the memory 6 by sending a synchronizing signal Tmd to the d/a converter 9 which provides the input to a video monitor 10. The timing generator sends synchronized vertical and horizontal scanning signals Tm to the monitor 10 so that the information stored in the memory or that generated directly by the TV camera can be selectively displayed upon the monitor screen.

Transmitted roentgenoscopic images of the target displayed on the image intensifier can be monitored continually using low levels of radiation thereby exposing the patient and/or technician to low dosages. When it becomes necessary to examine selected images in greater detail, the exposure radiation level is increased and the following procedures are carried out. Initially, the ordinary operation of the camera is deactivated for a short period of time by closing switch 8 and the photogene image on the TV monitor is allowed to vanish completely. Closing switch 8 also causes a signal $Tx_2$ to be sent from the timing generator 7 to the x-ray source thereby increasing the level of output of the x-ray source. The target is radiated with higher levels of radiation thereby causing a more defined or sharper selective image to be produced on the image intensifier. The TV camera is then reactivated in synchronization with the memory and monitor systems and the selected image is passed through the a/d converter to memory where it is stored. Once the selected memory has been stored, normal operations can be restored by opening switch 8.

Figure 2:
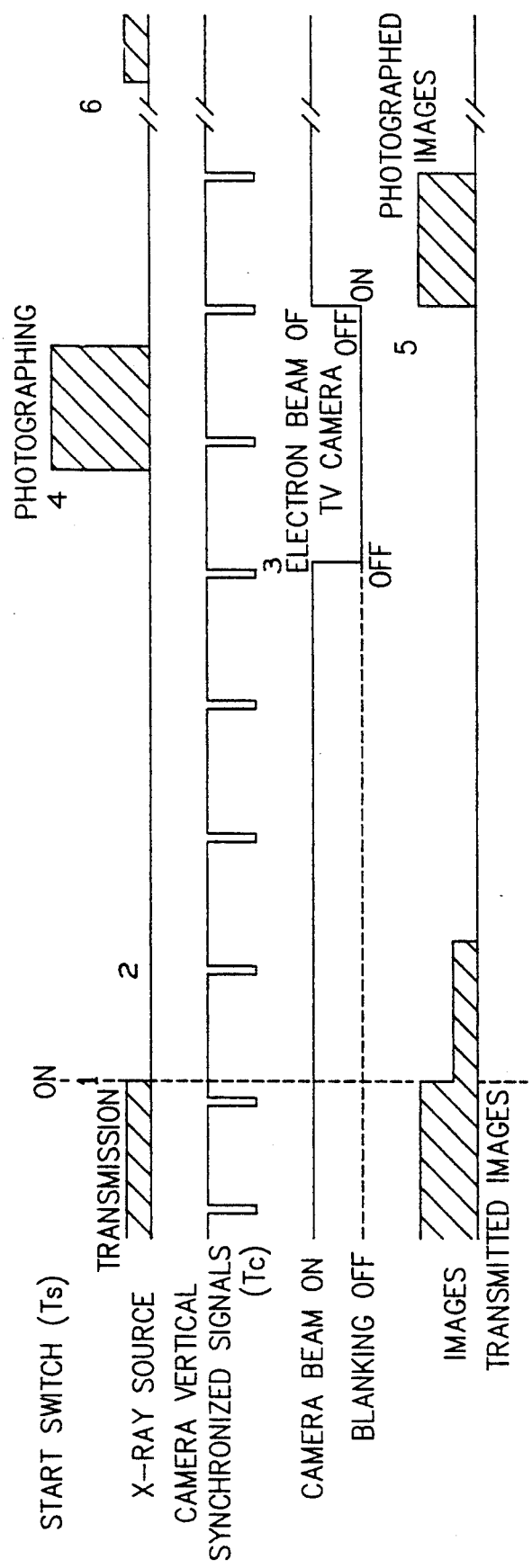
FIG. 2 is a timing diagram describing the operation of the apparatus shown in FIG. 1.

The operational procedures of the above-noted apparatus will now be described in greater detail with reference to FIG. 2. When it is desired to record a selected image, switch 8 is closed at step 1 and the normal viewing mode is now changed to a photographing and storing mode. At step 2, the photogene image on the TV camera is allowed to vanish completely by blanking out at least three image frames At step 3, the video camera 4 is inactivated by means of a blanking circuit to turn off the electron beam and the x-ray source is readied to produce a higher level output. At step 4, a signal $Tx_2$ from the timing generator is sent to the x-ray source and the target is then exposed to higher levels of radiation to produce a sharp image upon the image intensifier. At step 5, the TV camera is once again turned on in synchronization with the memory circuits and the monitor circuits. Upon reactivation of the camera, a 1-frame of the selected image is forwarded to the memory where it is stored. The image may be simultaneously displayed on monitor 10. At this time normal operations can be resumed by opening switch 8.

As can be seen, the above-noted procedures makes it possible to display images produced by x-ray radiation and permits the selected images to be stored in memory where they can be recalled at a later time. The transmitted images can also be observed directly upon a monitor screen through means of the video camera without passing directly through the digital memory 6 under control of timing generator. Accordingly, the x-ray signals can be monitored using low levels of radiation and only when a selected target is to be memorized are higher dosages of radiation utilized. This in turn protects both the patient and the technicians using the equipment while at the same time providing an important diagnostic tool to the examining physician.

While the present invention has been illustrated with reference to preferred embodiments, it should be understood that the invention is not limited to those precise embodiments, and that many modifications and variations thereof could be carried out by those skilled in the art without departure from the scope and spirit of this invention, as defined in the appended claims.

What is claimed is:

1. A system for viewing and selectively storing x-ray images of a target that includes:
   an x-ray source for radiating a target, said source having a first mode of operation during which the target is radiated with low intensity radiation and a second mode of operation during which the target is radiated with radiation of a higher intensity;
   image intensifier means for visually displaying x-ray images of the target, positioned to receive radiation from said x-ray source through the target;
   video camera means for producing video camera images of the visually displayed x-ray images of the target;
   a monitor having a screen for displaying said video camera images of said target;
   memory means for storing selected video images of the target, operatively connected to said video camera means;
   control means operatively coupled to said x-ray source, said video camera means, said monitor and said memory means for normally operating the x-ray source in said first mode of operation and displaying low intensity x-ray images on the monitor; and
   switching means associated with the control means that is operable to: a) inactivate the video camera means for a predetermined period of time during which the monitor screen is cleared of residual images, b) turn off the electron beam of the video camera means, c) switch said x-ray source to said second mode of operation, d) reactivate said video camera means, and connect the memory means to said video camera means for storing a selected high intensity video image of the target.

2. The system of claim 1 that further includes a means for converting said selected high intensity video image from an analogue signal to a digital signal in preparation for storage in the memory means, and
   a means for converting the stored digital signals from a digital signal to an analogue signal for display on said monitor.

3. A method of viewing and selectively storing x-ray images of a target to minimize the exposure of the target to radiation that includes the steps of
   radiating a target with a first low level radiation and visually displaying x-ray images on an image intensifier,
   photographing said displayed x-ray images with a video camera and displaying the video image signals on a monitor,
   identifying a selected image on said monitor,
   inactivating the video camera for a predetermined number of video frames to clear the monitor,
   radiating the target with a second higher level of radiation to produce an enhanced selected x-ray image,
   reactivating the video camera to produce an enhanced video image of the enhanced x-ray image, and
   storing the enhanced video image in memory.

4. The method of claim 3 that includes the further step of converting the video signal to a digital signal prior to storing the signal in memory.

5. The method of claim 3 further including inactivating the video camera for more than one frame before radiating the target with higher level radiation.

6. The method of claim 3 further including blanking the vertical scanning of the video camera for three frames before radiating the target with higher level radiation and turning off the electron beam of the video camera for two additional frames while radiating the target with higher level radiation.

* * * * *